United States Patent
Bock et al.

(10) Patent No.: US 6,561,007 B1
(45) Date of Patent: May 13, 2003

(54) DEVICE FOR CARRYING OUT SIDE IMPACT TESTS ON MOTOR VEHICLE PASSENGER RESTRAINT SYSTEMS

(75) Inventors: Heinz Bock, Heubach (DE); Thomas Herpich, Uhingen-Sparwiesen (DE); Jürgen Hirth, Gschwend (DE); Stein-Helge Mundal, Alfdorf (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/555,186

(22) PCT Filed: Dec. 4, 1998

(86) PCT No.: PCT/EP98/07896

§ 371 (c)(1),
(2), (4) Date: May 25, 2000

(87) PCT Pub. No.: WO99/30125

PCT Pub. Date: Jun. 17, 1999

(30) Foreign Application Priority Data

Dec. 11, 1997 (DE) .................................. 297 21 927 U

(51) Int. Cl.$^7$ ................................................ G01M 7/00
(52) U.S. Cl. ...................................... 73/12.01; 73/856.3
(58) Field of Search ........................... 73/12.01, 12.04, 73/12.09, 865.3

(56) References Cited

U.S. PATENT DOCUMENTS

| | | | |
|---|---|---|---|
| 4,231,607 A | * | 11/1980 | Bohlin ........................ 296/63 |
| 4,691,556 A | | 9/1987 | Mellander et al. |
| 5,483,845 A | | 1/1996 | Stein et al. |
| 5,485,758 A | | 1/1996 | Brown et al. |
| 5,623,094 A | | 4/1997 | Song et al. |
| 5,635,624 A | | 6/1997 | Cerny |
| 5,716,094 A | * | 2/1998 | Bhalsod et al. ............. 296/188 |
| 5,749,193 A | * | 5/1998 | Bucher ..................... 52/506.06 |

FOREIGN PATENT DOCUMENTS

| | | |
|---|---|---|
| DE | 3526813 | 1/1987 |
| DE | 4106929 | 9/1992 |
| DE | 9408056 | 10/1994 |
| DE | 4407256 | 2/1996 |
| DE | 0756970 | 2/1997 |
| EP | 0701114 | 3/1996 |
| GB | 2313917 | 12/1997 |
| JP | 59196442 | 11/1984 |

OTHER PUBLICATIONS

*Flankenschutz*, Spezial Sicherheit, pp. 56–60, Apr. 1977.
*Seitwarts marsch*, Spezial, pp. 80–88, Feb. 1996.

* cited by examiner

*Primary Examiner*—Max Noori
(74) *Attorney, Agent, or Firm*—Tarolli, Sundheim, Covell & Tummino L.L.P.

(57) ABSTRACT

A device for testing vehicle occupant restraint systems for a side impact, with a target carriage (10) which is provided with a structure (12) in which there are mounted a seat (14) for a test dummy (16), an imitation (18) of the lower region of a vehicle side structure and the side impact restraint system (20) to be tested, and with an impact carriage (22) which is provided with a pushing surface (24) associated with the imitation (18) of the lower region of the vehicle side structure, the impact carriage (22) and the target carriage (10) being movable relative to each other such that an impact of the pushing surface (24) and the imitation (18) of the lower region of the vehicle side structure onto each other can be brought about at a predetermined speed, is characterized in that the structure (12) is additionally provided with at least one imitation (28) of the upper region of a vehicle side structure and that the impact carriage (22) is provided with an upper pushing surface (36) arranged above the lower pushing surface (24).

11 Claims, 4 Drawing Sheets

DEVICE FOR CARRYING OUT SIDE IMPACT TESTS ON MOTOR VEHICLE PASSENGER RESTRAINT SYSTEMS

BACKGROUND OF THE INVENTION

The invention relates to a device for testing vehicle occupant restraint systems for a side impact, with a target carriage which is provided with a structure in which there are mounted a seat for a test dummy, an imitation of the lower region of a vehicle side structure and the side impact restraint system to be tested, with an impact carriage which is provided with a pushing surface associated with the imitation of the lower region of the vehicle side structure, the impact carriage and the target carriage being movable relative to each other such that an impact of the pushing surface and the imitation of the lower region of the vehicle side structure onto each other can be brought about at a predetermined speed.

BACKGROUND OF THE INVENTION

Such a device, which is known from U.S. Pat. No. 5,485,758, is shown diagrammatically in FIG. 6. On the target carriage 10, the structure 12 is mounted in which are arranged the seat 14 for a test dummy 16, the imitation 18 of the lower region of a vehicle side structure and the side impact restraint system 20 to be tested. The impact carriage 22 is provided so as to be movable relative to the target carriage 10, which impact carriage 22 is provided with a pushing surface 24.

By means of this device, the most varied side impact restraint systems for almost all vehicles can be tested. The imitation 18 of the vehicle side structure is constructed such that it corresponds to the type of vehicle of which the test is to be simulated. In addition, the corresponding side impact restraint system 20 is mounted, which is to come into use in this type of vehicle. If then an impact of the pushing surface 24 onto the imitation 18 of the vehicle side structure is brought about at a predetermined speed, the stresses occurring on the test dummy 16 can be detected in a great variety of ways, for example by transducers or by high speed film recordings. Through evaluation of the detected data, conclusions can be drawn as to the effectiveness of the tested side impact restraint system, without a real test having to be carried out with a vehicle for this purpose.

With this known test device, however, only side impact restraint systems can be tested which, when they are used in the vehicle, extend between the upper body of a vehicle occupant and the lower region of the door. It is not possible to test the side impact restraint systems recently being increasingly used, which provide a restraint effect for the head of a vehicle occupant.

SUMMARY OF THE INVENTION

The invention provides a test device with which also side impact restraint systems can be tested which make available a restraint effect for the head of a vehicle occupant. This is made possible in a device of the type initially mentioned in that the structure is additionally provided with an imitation of the upper region of a vehicle side structure and that the impact carriage is provided with an upper pushing surface arranged above the lower pushing surface. In this way, through the cooperation of the imitation of the lower and of the upper region of the vehicle side structure, for example a complete door, the associated A, B, C or D column and the associated roof frame can be simulated, and the behavior of a side impact restraint system which protects either exclusively the head of a vehicle occupant or also his upper body can be tested in combination with the imitation of the entire door.

According to a preferred embodiment of the invention, provision is made that the upper pushing surface is adjustable relative to the lower pushing surface. According to the preferred embodiment, provision is also made that the upper pushing surface is able to be exchanged for a further pushing surface with a different height. Owing to this variability of the impact carriage, the most various objects can be simulated with which a side impact can occur, for example motor vehicles of different sizes, trucks, etc.

According to the preferred embodiment of the invention, in addition a coupling element is provided which connects the imitation of the upper region of the vehicle side structure with the imitation of the lower region of the vehicle side structure. By means of the coupling element, the type of mounting of the imitation of the upper region of the vehicle side structure to the imitation of the lower region of the vehicle side structure can be embodied individually, so that the deformation behavior of the upper region of the vehicle side structure of the most various vehicles can be simulated, i.e. a comparatively flexible structure of the upper door strut and of the roof frame or a comparatively rigid construction.

BRIEF DESCRIPTION OF THE DRAWINGS

Further advantageous developments of the invention will be apparent from the sub-claims.

The invention is described hereinbelow with reference to a preferred embodiment which is illustrated in the attached drawings. In these.

DESCRIPTION OF THE INVENTION

Figure 1:
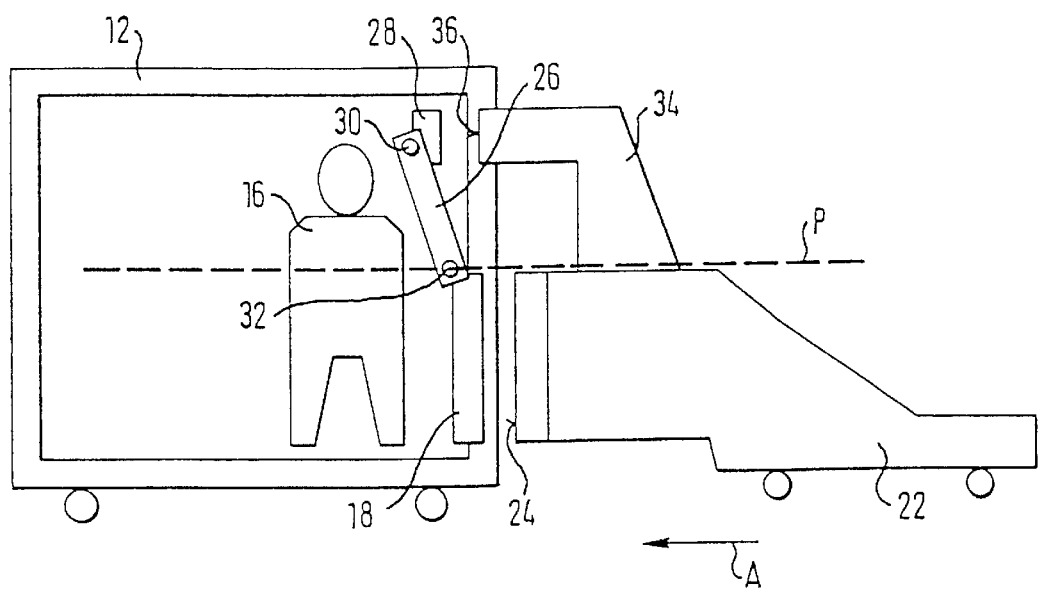
FIG. 1 shows in a diagrammatic side view a target carriage and an impact carriage of the device according to the invention, for testing vehicle occupant restraint systems for a side impact.
Figure 6:
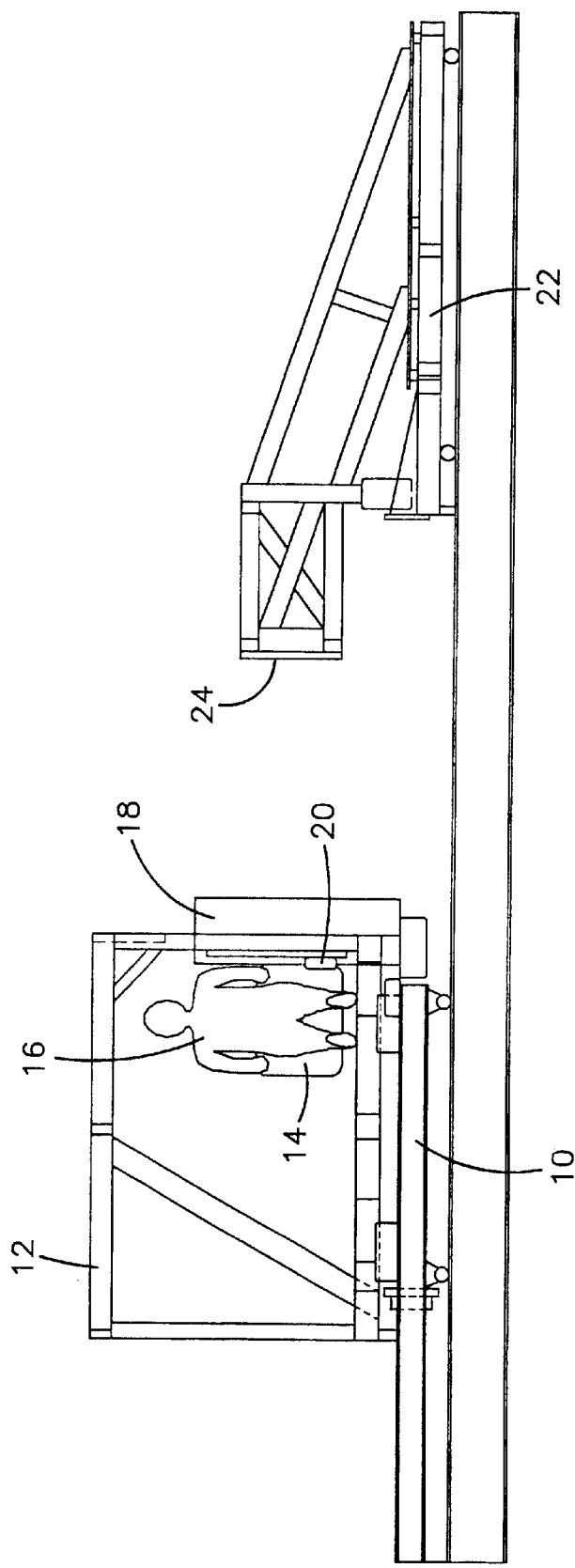
FIG. 6 shows a diagrammatic side view of a device for testing vehicle occupant restraint systems for a side impact from the prior art, in which the target carriage illustrated in FIGS. 1 to 5 and the impact carriage according to the invention can be used.

In FIG. 1 a structure 12 is shown diagrammatically, which can be used instead of the structure 12 of a conventional test device shown in FIG. 6. This also applies to the impact carriage 22 shown in FIG. 1.

The structure 12 shown in FIG. 1 is provided with an imitation 18 of the lower region of a vehicle side structure. A coupling element 26 is articulated thereon, which connects an imitation 28 of the upper region of a vehicle side structure with the imitation 18 of the lower region. The coupling element 26 is connected with the imitation of the upper and of the lower region of the vehicle side structure by articulations 30 and 32, respectively. At least one of the articulations 30, 32 is preferably an articulation with several degrees of freedom. Through a suitable selection of the imitations 18, 28 of the lower and, respectively, of the upper region of the vehicle side structure, of the coupling element 26 and of the articulations 30, 32, any desired side structure of a vehicle to be tested can be simulated. Side structure here means in particular a vehicle door with associated window frame, the floor strut of the vehicle and also the roof frame.

The deformation behavior of the window frame and of the roof frame can be simulated by suitable dimensioning of the resistance which the coupling element 26 and the articulations 30, 32 offer to a displacement of the imitation 28 of the upper region of the vehicle side structure.

The impact carriage 22 is provided with a pushing surface 24 associated with the imitation 18 of the lower region of the vehicle side structure. The lower region of the vehicle side structure is understood here to mean the region beneath the lower window edge. In addition, a top structure 34 is mounted on the impact carriage 22, which is provided with a pushing surface 36 associated with the imitation 28 of the upper region of the vehicle structure. According to their arrangement, the imitations 18, 28 of the lower and, respectively, of the upper region of the vehicle side structure and the pushing surfaces 24, 36 associated therewith are designated hereinbelow as lower and upper imitation, respectively, and as lower and upper pushing surface, respectively. The upper pushing surface 36 is adjustable relative to the lower pushing surface 24. The adjustment can be carried out both parallel to the direction A in which the impact carriage 22 can be moved towards the target carriage 10, and also perpendicularly to this direction along a direction which is perpendicular to the plane of the drawing. Consequently, any desired object can be simulated, which is to be used for the test of the side impact restraint device. By means of this adjustment therefore the impact sequence of the upper and of the lower pushing surface 36, 24 onto the imitations 28, 18 can be carried out above and beneath an imaginary plane P perpendicular to the plane of the drawing, which plane P runs approximately at the height of the lower window edge of a vehicle which is to be simulated.

The side impact restraint system which is to be tested (not illustrated in FIG. 1) can be arranged according to the arrangement later provided in reality either in the vicinity of the upper imitation 28 or of the lower imitation 18, on the imitation itself, or on the coupling element.

Figure 2:
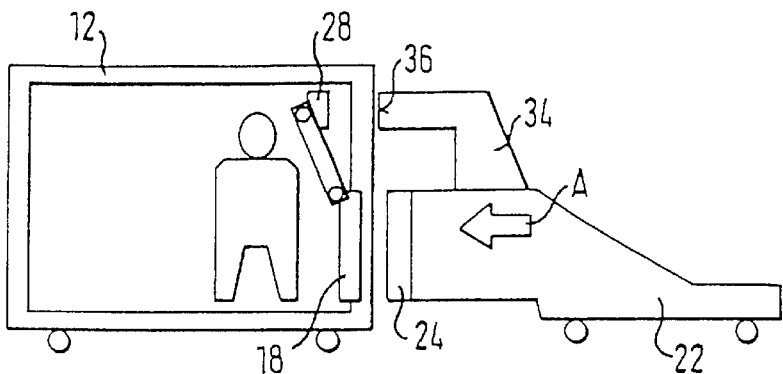
FIGS. 2 to 5 show in a diagrammatic side view the target carriage and the impact carriage of FIG. 1 in various stages during a simulation of a side impact.

In FIGS. 2 to 5, various steps during a test carried out with the device according to the invention are illustrated. In FIG. 2 the impact carriage 22, which moves at a predetermined speed in the direction of arrow A towards the target carriage, is shown at a moment in which the lower pushing surface 24 is situated shortly before touching the lower imitation 18.

Figure 3:
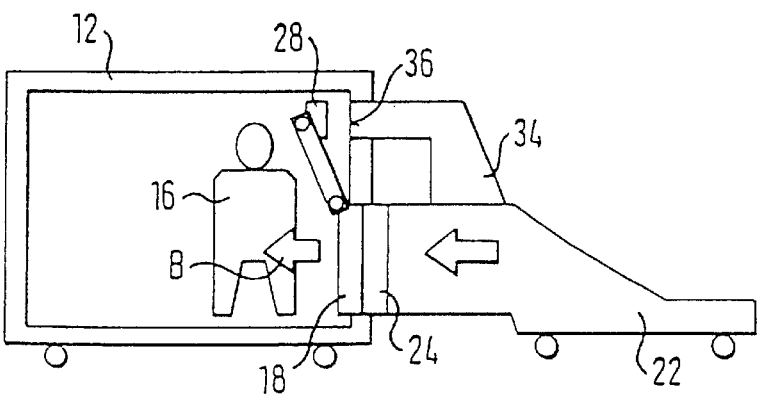

In FIG. 3, the structure 12 and the impact carriage 22 are illustrated at that moment at which the lower pushing surface 24 just touches the lower imitation 18. The upper pushing surface 36 is still situated at a distance from the upper imitation 28. This corresponds for example to the sequence of a side impact in the case of a motor vehicle, the window frame of which is inclined inwards in the upper region with respect to the center of the door. From the moment which corresponds to the state shown in FIG. 3, the lower imitation 18 begins to move along the arrow B towards the vehicle occupant under the action of the pushing surface 24. Depending on the design of the activating device, the side impact restraint system which is to be tested is activated approximately from this moment. The coupling element 26, which simulates the B-column, will thereby perform a swivelling movement about the articulation 30 towards the occupant.

Figure 4:
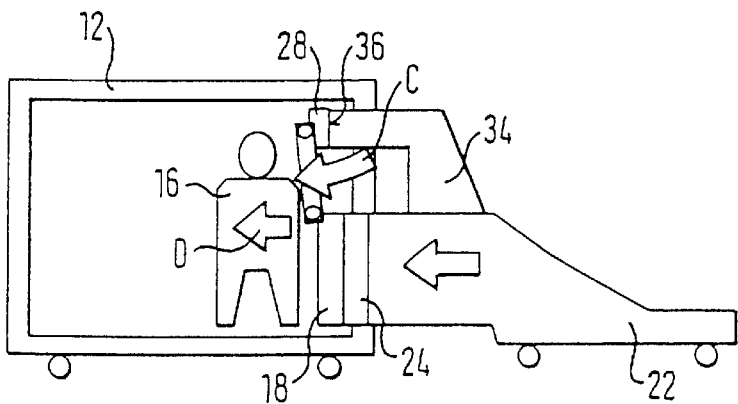

In FIG. 4 the structure 12 and the impact carriage 22 are shown at the moment in which the upper pushing surface 36 touches the upper imitation 28. The upper imitation 28 now begins to move under the action of the upper pushing surface 36 towards the test dummy (see arrow C). Through the displacement of the lower imitation 18, in addition the seat arranged in the structure 12 with the test dummy 16 situated thereon are accelerated in the direction of the arrow D.

Figure 5:
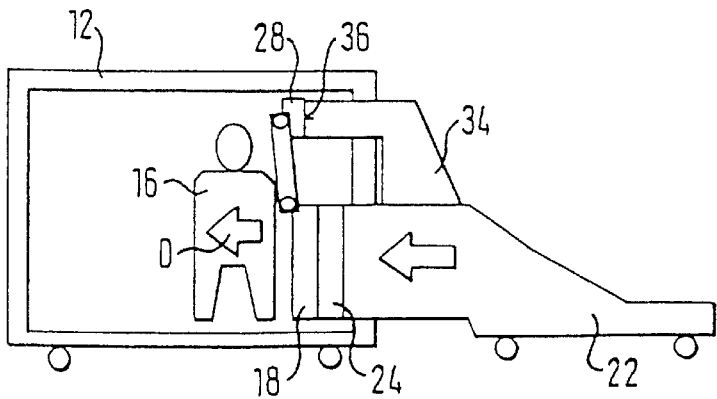

In FIG. 5 the impact carriage 22 is shown at the moment of maximum penetration into the structure 12. The lower imitation 18 and the upper imitation 28 have move a under the action of the lower and of the upper pushing surfaces 24, 36 towards the left-hand side with respect to the figure, and the test dummy 16 has moved through the action of the lower and of the upper imitations 18, 28 likewise to the left with respect to the figure.

This sequence of the deformation of the individual structural parts by which the behavior of a real vehicle structure is imitated, makes it possible to precisely analyze the protective effect of a side impact restraint system which is to be tested. Compared with the tests carried out hitherto with complete vehicles or car bodies, considerable savings are materializing, without the results which are obtained greatly deviating from the results which are obtained in tests with complete vehicles or car bodies. This is due to the fact that with the device according to the invention, the side structure of a vehicle the side impact of which is to be simulated can be imitated close to reality.

Apart from a side impact gas bag, a safety belt can also be a component of a side impact restraint system which is to be tested, the behavior of which belt is tested in cooperation with a vehicle seat. A side impact gas bag which is to be tested can be arranged underneath a panelling on the lower or upper imitation and can emerge therefrom after activation.

Figure 7:
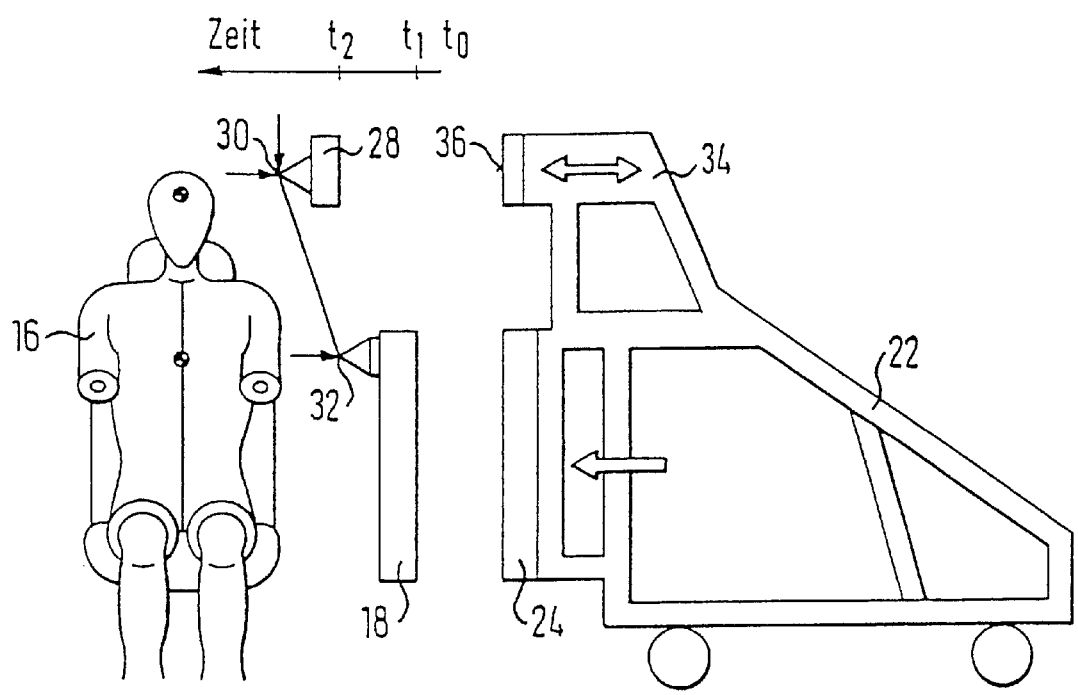
FIG. 7 shows a view corresponding to FIG. 1 of the target carriage and of the impact carriage according to the invention, in which the movement sequences illustrated in FIGS. 2 to 4 are combined.

In FIG. 7 the chronological sequences are represented again in combination, which have already been described with the aid of FIGS. 2 to 4. It can be seen that the articulation 30 has two degrees of freedom, namely in direction A and in vertical direction. The articulation 32 on the other hand has only one degree of freedom, namely in direction A. In FIG. 7 a time axis is also drawn, which shows the position of structure 12 and impact carriage 22 at different moments. At moment $t_0$ (corresponding to FIG. 2) the pushing surface 24 and the lower imitation 18 are still spaced apart from each other. At moment $t_1$ (corresponding to FIG. 3) the pushing face 24 and the lower imitation 18 just touch each other.

Then, the coupling element 26 is swivelled about the axis 30 in a clockwise direction, which simulates the deformation of the B-column. At moment $t_2$ the pushing surface 36 touches the imitation 28.

Through the possibility of adjusting the upper pushing surface 36 relative to the lower pushing surface 24 (indicated by a double arrow), the time range between $t_1$ and $t_2$ can be altered such that various deformation behaviors of lower vehicle side structure, B-column and upper vehicle side structure can be simulated.

Figure 8:
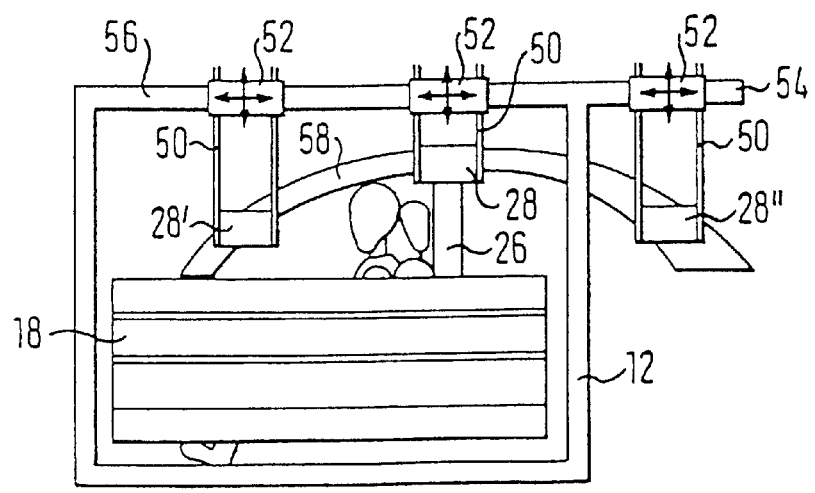
FIG. 8 shows a view of the structure viewed from the strike carriage.

In FIG. 8 a further embodiment of the structure 12 is illustrated. Here, imitations 28, 28' and 28" are provided, arranged one behind the other in the longitudinal direction of the vehicle, of which only the imitation 28 is connected via the coupling element 26 with the imitation 18. Each imitation 28, 28', 28" is inserted into a separate suspension 50, which is connected with a carriage 52 on a cantilever arm 54 of the frame of the structure 12. The carriages 52 are mounted on an upper transom 56 of the carriage of the structure 12 and are adjustable in longitudinal direction of the vehicle. The suspensions 50 are adjustable in vertical direction to the carriages 52. The suspensions 50 serve only for the positioning of the imitations 28 to 28" until on contact with the pushing surfaces 36 these are moved out of the suspensions 50. In addition, a connection element 58 is provided, which simulates the roof frame and connects the imitations 28 to 28" with each other. The impact carriage 22 in this embodiment has a separate top structure 34 with an associated pushing surface 36 for each imitation 28, 28', 28". It is also important that a locking arrangement is provided between each pushing surface 36 and the associated imitation 28, 28', 28". This locking arrangement connects the pushing surface with the imitation on contact and prevents a detachment thereof during the simulation. It is not until the simulation is completed that an unlocking can be carried out.

What is claimed is:

1. A device for testing vehicle occupant restraint systems for a side impact, with a target carriage (10) which is provided with a structure (12) in which there are mounted a seat (14) for a test dummy (16), an imitation (18) of the lower region of a vehicle side structure and the side impact restraint system (20) to be tested, and with an impact carriage (22) which is provided with a pushing surface (24) associated with the imitation (18) of the lower region of the vehicle side structure, the impact carriage (22) and the target carriage (10) being movable relative to each other such that an impact of the pushing surface (24) and the imitation (18) of the lower region of the vehicle side structure onto leach other are brought about at a predetermined speed, characterized in that the structure (12) is additionally provided with at least one imitation (28) of the upper region of a vehicle side structure and that the impact carriage (22) is provided with an upper pushing surface (36) arranged above the lower pushing surface (24), the upper pushing surface (36) being adjustable relative to the lower pushing surface (24), characterized in that the imitation (28, 28', 28") of the upper region of the vehicle side structure is mounted via a suspension (50) on an adjustable carriage (52) and so as to be vertically adjustable, and that the carriage (52) is mounted on the structure (12) so as to be displaceable in the longitudinal direction of the vehicle.

2. A device for testing vehicle occupant restraint systems for a side impact, with a target carriage (10) which is provided with a structure (12) in which there are mounted a seat (14) for a test dummy (16), an imitation (18) of the lower region of a vehicle side structure and the side impact restraint system (20) to be tested, and with an impact carriage (22) which is provided with a pushing surface (24) associated with the imitation (18) of the lower region of the vehicle side structure, the impact carriage (22) and the target carriage (10) being movable relative to each other such that an impact of the pushing surface (24) and the imitation (18) of the lower region of the vehicle side structure onto each other are brought about at a predetermined speed, characterized in that the structure (12) is additionally provided with at least one imitation (28) of the upper region of a vehicle side structure and that the impact carriage (22) is provided with an upper pushing surface (36) arranged above the lower pushing surface (24), the structure (12) further including a coupling element (26) connecting the imitation (28) of the upper region of the vehicle side structure with the imitation (18) of the lower region of the vehicle side structure.

3. The device according to claim 2, characterized in that the coupling element (26) is mounted articulatedly on the imitation (28) of the upper region of the vehicle side structure.

4. The device according to claim 2, characterized in that the coupling element is mounted articulatedly on the imitation (18) of the lower region of the vehicle side structure.

5. The device according to claim 2, characterized in that for the articulated mounting of the coupling element (26) at least one articulation (30; 32) with several degrees of freedom is used.

6. The device according to claim 5, characterized in that an upper articulation (30), which connects the coupling element (26) with the imitation (28) of the upper region, has two degrees of freedom, in direction of movement (A) and also in vertical direction, and a lower articulation (32), which connects the coupling element (26) with the imitation (18) of the lower region, has one degree of freedom, in direction of movement (A).

7. The device according to claim 2, characterized in that the coupling element (26) simulates one of the group consisting of A, B, C and D columns of the vehicle.

8. The device according to claim 6, characterized in that several imitations (28, 28', 28") are provided, arranged one behind the other in the longitudinal direction of the vehicle.

9. The device according to claim 8, characterized in that for each imitation (28, 28', 28") a separate top structure (34) is provided on the impact carriage (22).

10. The device according to claim 9, characterized in that the imitations (28, 28', 28") are secured to each other by a connecting element (58) simulating a roof frame.

11. The device according to claim 2, characterized in that the side impact restraint system which is to be tested is arranged at the coupling element (26).

* * * * *

UNITED STATES PATENT AND TRADEMARK OFFICE
CERTIFICATE OF CORRECTION

PATENT NO. : 6,561,007 B1
DATED : May 13, 2003
INVENTOR(S) : Heinz Bock et al.

It is certified that error appears in the above-identified patent and that said Letters Patent is hereby corrected as shown below:

Column 5,
Line 32, after "onto" change "leach" to -- each --.

Column 6,
Line 39, after "claim" change "6" to -- 2 --.

Signed and Sealed this

Twenty-fifth Day of May, 2004

JON W. DUDAS
*Acting Director of the United States Patent and Trademark Office*